Patented May 12, 1942

2,282,644

UNITED STATES PATENT OFFICE 2,282,644

SUBRESINOUS ACYLATION REACTION COMPOUND

Melvin De Groote, University City, and Bernhard Keiser, Webster Groves, Mo., assignors to Petrolite Corporation, Ltd., Wilmington, Del., a corporation of Delaware No Drawing. Original application June 27, 1940, Serial No. 342,714. Divided and this application June 14, 1941, Serial No. 398,142

6 Claims. (Cl. 260—404)

This invention relates to a new composition of matter, in our present application being a division of our patent application Serial No. 342,714, filed June 27, 1940, which resulted in U. S. Patent No. 2,250,404, dated July 22, 1941.

The main object of our present invention is to provide a new material or composition of matter that is particularly adapted for use as a demulsifier in the resolution of crude oil emulsions, but which may be used for other purposes or for uses in other arts that we have not as yet completely investigated.

It is well known that certain hydroxylated detergent-forming acid bodies may be treated with polybasic acids so as to yield valuable demulsifying agents. Generally speaking, the detergent type of acid employed is a fatty acid, and the polybasic acid employed is a dibasic acid. The acidic body so obtained, regardless of whether the residual carboxyl radical or radicals are derived from the fatty body or from the dibasic acid body, may remain as such, or may be neutralized or esterified. If esterified, such esterification may be conducted in any one of a number of ways. For instance, the carboxylic radical may be esterfied with a hydroxy acid, i. e., an acid acting as an alcohol, or with a monohydric alcohol or a polyhydric alcohol. Furthermore, it may be esterified with an amino alcohol, such as monoethanolamine, diethanolamine, triethanolamine, or various other amines.

We have found that if the polybasic carboxy acid fatty acid condensation product or esterification product is derived by a reaction between ricinoleic acid or a ricinoleic acid body and a polybasic carboxy acid, and if such ester or condensation product, which is essentially an acidic fractional ester, is further esterified or condensed with tris (hydroxymethyl) aminomethane or a homologue thereof, as subsequently described, then one obtains a new composition of matter which has unusual effectiveness as a demulsifier. Such final reactions, i. e., involving the acidic fractional ester and the amine of the kind mentioned, must be conducted so that at least one polybasic carboxy acid radical, for instance, the carboxyl radical of phthalic acid, enters into reaction with the amine either by virtue of the formation of an ester involving an alcoholiform hydroxyl, or by amidification involving an amino hydrogen atom. Subsequently it will be indicated that one variant or species of the broad class of amines herein contemplated is characterized by the absence of hydroxyl groups, but presence of an ether linkage. Needless to say, such compounds can only enter into amidification reactions; whereas, tertiary amines must contain at least one alcoholiform hydroxyl, since this particular type can only react by means of an esterification reaction. Ricinoleic acid radicals, if present, may enter into both types of reaction.

It is not intended to exclude the possibility that part of the carboxyl radicals present, whether of the polybasic carboxy acid type or ricinoleic acid type, may remain as such, or may be neutralized with any suitable base, such as caustic soda, caustic potash, triethanolamine, amylamine, cyclohexylamine, or the like, or may be esterified with any monohydric or polyhydric alcohol. In any event, the final product must involve a compound of the kind obtained by esterification or amidification between a carboxyl of a polybasic acid and a hydroxyl radical constituting part of an amine of the kind previously mentioned, or an amino hydrogen atom of such amine, or for that matter, both types of reaction may be involved. Our preference is to select a tris (hydroxymethyl) amine type of compound which is characterized by the fact that there is no aryl radical directly attached to the amino nitrogen atom. In other words, we prefer an amine of the type whose basicity at least approximates that of an ordinary alkylolamine, as distinguished from the basicity of arylamines.

The acidity of the polybasic carboxy acid-ricinoleic body condensation product may be due either to the presence of carboxyls which are part of the ricinoleic acid radical, or carboxyls which are part of the polybasic carboxy acid radical. Our preference is to employ acidic fractional esters of the type characterized by having present only such free-carboxyl radicals which are part of a polybasic carboxy acid radical.

For the sake of convenience, in the hereto appended claims both types of reactions, amidification and esterification will be referred to as acylation reactions. In other words, reference to an acylation reaction is not intended to differentiate between whether an esterification reaction takes place, or an amidification reaction, or both. In the hereto appended claim the expression "acylation—reactive amine" is intended to designate an amine having either at least one amino hydrogen atom, or at least one alcoholiform hydroxyl radical, or both, that is, an amine capable of entering into acylation reactions as differentiated from being limited to salt formation.

Ricinoleic acid is most readily available in the form of castor oil, which contains about 85% triricinolein. Instead of ricinoleic acid, one may employ monoricinolein, diricinolein, methyl ricinoleate, ethyl ricinoleate, benzyl ricinoleate, cyclohexyl ricinoleate, etc. Similarly, one may employ polyricinoleic acid, such as diricinoleic acid, triricinoleic acid, and tetraricinoleic acid; or one may employ the dibasic type of diricinoleic acid. Obviously, ricinoleic acid esters can be derived from polyhydric alcohols other than glycerol, for instance, from the various glycols, polyglycols, polyglycerols, methyl glycerol, and the like. Ordinarily one would employ the cheapest source of the ricinoleic acid radical, which is castor oil. Slightly blown castor oil or the like may be used.

Castor oil can be treated with one mole or two moles of glycerol, or any intermediate quantity, to produce a material consisting largely of diricinolein, monoricinolein, and some triricinolein, with perhaps a small amount of free glycerol. Such material is commonly referred to as superglycerinated castor oil or superglycerinated triricinolein. Such mixture may be considered as a typical ricinoleic acid body.

Castor oil (triricinolein) can be combined with phthalic acid, or most suitably, with phthalic anhydride, to give a monophthalated castor oil, or a diphthalated castor oil, or a triphthalated castor oil. The mixture of the di- and triphthalated castor oil may be referred to as polyphthalated castor oil. It is well known that castor oil may contain small percentages of ricinoleic acid; and thus, in the phthalation process one may obtain some phthalated ricinoleic acid or phthalated polyricinoleic acid. Furthermore, it is known that during the phthalation process, either due to water which is present prior to the inception of the reaction, or water which is formed during the reaction, one may obtain minor amounts of monoricinolein or diricinolein. Thus, the expression "phthalated castor oil," "monophthalated castor oil," or "diphthalated castor oil," or "triphthalated castor oil," or "polyphthalated castor oil" is intended to include not only the derivatives of triricinolein, but also the various other phthalated bodies which have just been mentioned, as well as the small quantities of phthalated dihydroxystearic acid which is present in small amounts in substantially all castor oils. Hence, phthalated compounds of the kind described represent the primary or bulk of constituents present; but the others appear also and are not objectionable. Various additional types may also be present, as, for instance, where both carboxyl radicals attach themselves to one molecule, or to two different molecules of triricinolein.

In the preceding statement reference has been made to phthalated compounds, because phthalic acid and phthalic anhydride represent one of the cheapest sources of polybasic acids, and more particularly, dibasic acid. Obviously, any suitable polybasic acid, such as malic acid, maleic acid, oxalic acid, succinic acid, adipic acid, fumaric acid, glutaric acid, tartaric acid, citric acid, diphenic acid, tricarballylic acid, and the like may be employed. The anhydrides, acyl chlorides, and other obvious equivalents may be used instead of the acids themselves. Our preference is to use dibasic acids, rather than tribasic acids. As to the various dibasic acids, our preference is to employ the following: phthalic acid, oxalic acid, or maleic acid. Of these three, we prefer to use phthalic acid or phthalic anhydride, as previously indicated.

Insofar that such polybasic acid derivatives or ricinoleic acid bodies are well known compositions of matter, further description is unnecessary; but reference is made to U. S. Patent No. 1,976,602, dated October 9, 1934, to De Groote, Adams and Keiser, and to U. S. Patent No. 1,977,146, dated October 16, 1934, to Roberts. See also U. S. Patent No. 1,900,693, dated March 7, 1933, to Coolidge.

It is well known that paraffins can be treated with nitric acid so as to produce nitroparaffins or nitrites. Such nitroparaffins can be treated with aldehydes, particularly aliphatic aldehydes, having four carbon atoms or less, so as to produce nitroparaffins in which 1, 2 or 3 hydroxy alkyl radicals have been introduced, and particularly characterized by the fact that such nitroparaffins may have two or three alkylol groups attached to the same carbon atom. Such nitroparaffins can be readily converted into the corresponding amine. See "Chemical Industries," volume 45, No. 7, pages 664–668, December 1939. See also "Industrial and Engineering Chemistry," volume 32, No. 1, page 34.

Some examples of amines of the kind described are:

2-amino-2-methyl-1,3-propanediol

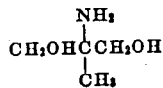

2-amino-2-ethyl-1,3-propanediol

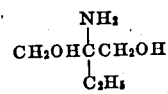

Tris (hydroxymethyl) aminomethane $$NH_2C(CH_2OH)_3$$

Such amines may be indicated by the following formula type:

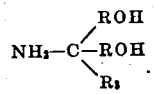

in which R represents a divalent radical, such as the methylene radical, and $R_3$ may be a hydrogen atom or the same as OH.R, or may represent a monovalent hydrocarbon radical, particularly an alkyl radical. In other words, the nature of $R_3$ may vary with the particular paraffin selected, and the molal reaction ratio between the nitroparaffin and aldehyde, in the event the paraffin is methane. Needless to say, such reactions between an aldehyde and a nitroparaffin may yield a monohydric alcohol, as distinguished from a nitro-diol, or nitro-triol, in the event the paraffin is methane. Such a compound can be converted into an alkylolamine. Such monohydroxylated alkylolamine, as, for example, 2-amino-1-butanol is not herein contemplated for reaction with condensation products, or esterification products of the kind previously described. Of various aldehydes employed for reaction with the nitroparaffins, formaldehyde, acetaldehyde, and butyraldehyde are to be preferred, with formaldehyde being particularly desirable. Cyclic aldehydes, such as benzaldehyde, or hexahydrobenzaldehyde, give very inferior yields.

Having obtained an amine of the kind above described, which is a primary amine, it can readily be converted into a secondary or tertiary amine by any of the procedures commonly employed for introducing an alkyl or similar monovalent hydrocarbon radical. By means of suitable "alkylating" agents, one may introduce alkyl groups, aryl radicals, aralkyl radicals, alicyclic radicals, hydroxy hydrocarbon radicals, and the like. Convenient reagents for such reactions include alkyl chlorides, such as butyl chloride, benzyl chloride, phenyl chloride, ethyl bromide, glycerol chlorhydrin, ethylene chlorhydrin, ethylene oxide, propylene oxide, diethyl sulfate, etc. The result of an alkylation reaction or the equivalent usually results in the formation of an amine salt, such as the amine hydrochloride. The liberation of the free amine depends on conventional treatment with caustic soda or the like. Treatment with a reactive alkylene oxide, such as ethylene oxide, propylene oxide, and the like does not result in the formation of a salt, and thus in many ways is a more suitable procedure. It should be noted that the hydroxyl, which is part of the radical OH.R, is reactive towards alkylating agents. In some instances perhaps such hydroxyl hydrogen atom is more reactive than the amino hydrogen atom, and perhaps in other instances not so reactive. The speed of the reaction depends, of course, on the reactants selected and the conditions of the reaction. However, it is to be noted that such reaction may result in the formation of an ether group. This may be illustrated by involving a butyl chloride and a hydroxyl hydrogen atom, thus:

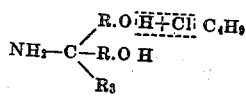

In this instance the radical $C_4H_9O.R.$ represents an alkoxy-alkyl radical, in which R might be obtained from any one of the aldehydes mentioned, for example, acetaldehyde or butyraldehyde; and the butyl radical might be replaced by some other radical, such as the hexyl radical, benzyl radical, cyclohexyl radical, or the like.

If ethylene oxide, propylene oxide, or the like are used to react with the hydrogen atom previously referred to, then the reaction proceeds as follows:

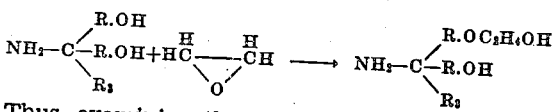

Thus, examining the class of compounds in the broadest aspect, they may be rewritten as:

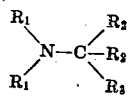

in which $R_2$ represents a monovalent alkylol radical, or may be a monovalent alkyl-ether radical, in which the carbon atom chain is interrupted at least once by an oxygen atom, or may be an alkylolether radical, which, in addition to having at least one hydroxyl radical, has the carbon atom chain interrupted at least once by an oxygen atom. Reactants such as glycerol monochlorhydrin or the corresponding chlorhydrins derived from di- or triglycerol, would permit the introduction of radicals containing more than one hydroxyl group, and being interrupted more than once by an oxygen atom. $R_3$ may be the same as $R_2$, or may be a hydrogen atom or any alkyl radical. $R_1$ represents a hydrogen atom, or may represent any monovalent hydrocarbon radical, hydroxy hydrocarbon radical, or hydroxy oxyhydrocarbon radical, characterized by having a hydroxyl radical, and having a carbon atom chain interrupted at least once by oxygen, or a radical derived by hypothetical removal of an alpha hydrogen atom from a carboxyl acid ester. It is to be noted that the preferred amine is of the type which contains no aryl radicals, particularly no aryl radicals attached to the amino nitrogen atom, and is preferably of the primary amine type. Due to its availability, the amine which we prefer to employ is tris (hydroxymethyl) aminomethane.

In view of what has been said previously, it is hardly necessary to describe the method of manufacturing the composition of matter herein contemplated. The esterification or amidification reactions employed are obvious in the light of previous examples. The first step is to select a suitable ricinoleic acid body, and preferably, one which is free from ricinoleic acid carboxy radicals, i. e., characterized by being part of the ricinoleic acid radical. Thus, the most feasible raw material would be castor oil or superglycerinated castor oil. Such material is analyzed so as to determine the acetyl or hydroxyl value. Having determined the acetyl or hydroxyl value, one adds sufficient polybasic carboxy acid or anhydride, preferably a dibasic acid, and more specifically, phthalic anhydride, to phthalate at least one alcoholiform hydroxyl and perhaps all the available hydroxyls in such a manner as to employ only one of the carboxyl radicals of the phthalic anhydride; i. e., one forms an acid phthalate or a compound having a number of free phthalic acid radicals.

As a specific example, one may combine a molecular proportion of triricinolein in the form of castor oil with sufficient phthalic anhydride to convert the material primarily into a mixture of diphthalated and triphthalated compounds. For instance, for each mole of triricinolein, one may add about two and one fourth or two and one-half moles of phthalic anhydride and heat with constant stirring at some suitable temperature, for instance, 140–180° C., until all free phthalic anhydride has disappeared. At this point one has formed a compound characterized by the fact that there is one free phthalic acid carboxyl present for each mole of phthalic anhydride employed. This stage of reaction is indicated by a determination of the acid value. While still hot, one adds a suitable proportion of an amine of the kind described, for instance, tris (hydroxymethyl) aminomethane. Sufficient of the hydroxylated amine is added so as to permit an esterification reaction with at least one of the free carboxyl radicals; and if desired, enough may be added to produce an esterification reaction, or an amidification reaction with more than one or with all the carboxyl radicals which may be present. The esterification reaction is conducted by further heating in presence or absence of an inert solvent and in the presence or absence of an anhydrous gas, or by other conventional means. Such esterification reaction takes place very readily. Similarly, a prolonged reaction, especially at a somewhat higher temperature than employed for esterification, for instance, from 20 to 40 or 60 degrees higher (centigrade scale), tends to increase amidification reactions when the amine employed is a primary or secondary amine, as in the present instance. The final product, which may be of a viscous or semi-resinous or sub-resinous nature, may be employed as such, or may be diluted with any suitable solvent of the kind hereinafter mentioned.

In such instances where the ricinoleic acid product derived by reaction with a polybasic acid contains two or more free carboxyl radicals, particularly carboxyl radicals which are part of the polybasic carboxy acid, such as radicals which are part of a phthalic acid residue, one is dealing with a compound which is essentially a polybasic acid. If such fractional ester happens to contain two free carboxyls, it may be considered as a dibasic acid. Diphthalated triricinolein would be a dibasic acid. If the amine contains at least two hydroxyl radicals, or at least, two amino hydrogen atoms, or at least one hydroxyl radical, and at least one amino hydrogen atom, then one is dealing with a polyfunctional or bifunctional compound; and thus reactions involving such type of compound with a polybasic or dibasic acid, such as diphthalated triricinolein may produce a sub-resinous or semi-resinous type of material. Compare analogous reactions involving glycerol or glycol, or monoethanolamine, and dibasic or polybasic acids.

Our preferred material is prepared from an amine of the type which is polyfunctional and is most desirably of the sub-resinous type, in other words, a compound or mixture of compounds which still represents a liquid or plastic or fusible mass at a temperature at which the final reaction is completed and is soluble in one or more solvents which may be hydrophile or hydrophobe in nature, including solutions of an acid, such as acetic acid, hydrochloric acid, etc.

Certain obvious functional equivalents suggest themselves and need not be described in detail. For instance, a halogenated ricinoleic acid body might be employed just as advantageously as an ordinary ricinoleic acid body. No advantage would be obtained by the use of more expensive raw material. Similarly, chlorinated phthalic anhydride or acid might be used in place of the less expensive raw material.

One need not comment on the fact that when the amine, particularly a basic amine, is added to the carboxy ricinoleic acid body, the first reaction is salt formation comparable to the formation of an amine phthalate or the like. However, on heating, provided that alcoholiform hydroxyls are present, esterification appears to take place in preference to amidification. As has been said, at somewhat higher temperatures amidification takes place readily; and in the absence of hydroxyl radicals, i. e., in the presence of a compound having one or two amino hydrogen atoms present, amidification takes place as the immediate type of reaction following salt formation. Thus, it is understood that compositions of matter of the kind herein contemplated may be obtained solely by esterification reactions, i. e., when the amine is of the tertiary hydroxylated type; or it may involve only amidification, as when the amine contains ether linkages and no alcoholiform hydroxyls, but does contain an amino hydrogen atom; or the formation of the condensation product may involve both types of reactions, as when a compound, such as tris (hydroxymethyl) aminomethane is employed.

Various other suitable reagents can be produced by reacting dimaleated triricinolein with one or two moles of 2-amino-2-methyl-1,3 propanediol or 2-amino-2-ethyl-1,3-propanediol. Similar derivatives obtained by the action of oxalic acid or maleic on triricinolein are also desirable.

Incidentally, in addition to the alkylating agents previously described, i. e., those employed to substitute certain radicals, particularly hydrocarbon or oxyhydrocarbon radicals, in place of amino hydrogen atoms, one may employ materials such as chlorethyl acetate or similar compounds, which are essentially esters of carboxy acids in which an alpha-hydrogen atom has been replaced by a halogen, such as chlorine.

The new material or composition of matter above described may be used as a break inducer in doctor treatment of the kind intended to sweeten gasoline. See U. S. Patent No. 2,157,223, dated May 9, 1939, to Sutton. Certain of the compounds that constitute the above forms of our invention, or which represent different examples of the new composition of matter herein described, are also of value as surface tension depressants, or wetting agents in the flooding of exhausted oil-bearing strata.

Having thus described our invention, what we claim as new and desire to secure by Letters Patent is:

1. A sub-resinous acylation reaction compound, derived by reaction between, first, an acidic fractional ester; and second, an acylation-reactive amine of the formula:

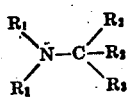

in which $R_2$ is selected from the class consisting of alkylol radicals and alkylol-ether radicals; $R_3$ is selected from the class consisting of hydrogen atoms, alkyl radicals, alkylol radicals and alkylol-ether radicals; and $R_1$ represents a member of the class consisting of alkylol radicals, alkylol-ether radicals and radicals derived by removal of an alpha-hydrogen atom from a monocarboxy acid ester; said aforementioned acidic fractional ester being derived from a polybasic carboxy acid and a ricinoleic acid compound selected from the class consisting of monohydric alcohol esters of ricinoleic acid; polyhydric alcohol esters of ricinoleic acid; ricinoleic acid; polyricinoleic acid; and lightly blown castor oil: said aforementioned acylation product having at least one polybasic acyl radical directly linked to the amine residue, as differentiated from the ricinoleyl radical.

2. A sub-resinous acylation reaction compound, derived by reaction between, first, an acidic fractional ester; and second, an acylation-reactive amine of the formula:

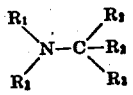

in which $R_2$ is selected from the class consisting of alkylol radicals and alkylol-ether radicals; $R_3$ is selected from the class consisting of hydrogen atoms, alkyl radicals, alkylol radicals and alkylol-ether radicals; and $R_1$ represents a member of the class consisting of alkylol radicals, alkylol-ether radicals and radicals derived by removal of an alpha-hydrogen atom from a monocarboxy acid ester; said aforementioned acidic fractional acid ester being derived from a dibasic carboxy acid and a ricinoleic acid compound selected from the class consisting of monohydric alcohol esters of ricinoleic acid; polyhydric alcohol esters of ricinoleic acid; ricinoleic acid; polyricinoleic acid; and lightly blown castor oil; said aforementioned acylation product having at least one dibasic acyl radical directly linked to the amine residue, as differentiated from the ricinoleyl radical.

3. A sub-resinous acylation reaction compound, derived by reaction between, first, an acidic fractional ester; and second, 2-amino-2-methyl-1,3-propanediol,

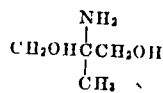

said aforementioned acidic fractional ester being derived from a dibasic carboxy acid and a ricinoleic acid compound selected from the class consisting of monohydric alcohol esters of ricinoleic acid; polyhydric alcohol esters of ricinoleic acid; ricinoleic acid; polyricinoleic acid; and lightly blown castor oil; said aforementioned acylation product having at least one dibasic acyl radical directly linked to the amine residue, as differentiated from the ricinoleyl radical.

4. A sub-resinous acylation reaction compound, derived by reaction between, first, an acidic fractional ester; and second, 2-amino-2-ethyl-1,3-propanediol

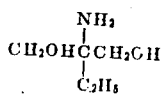

said aforementioned acidic fractional ester being derived from a dibasic carboxy acid and a ricinoleic acid compound selected from the class consisting of monohydric alcohol esters of ricinoleic acid; polyhydric alcohol esters of ricinoleic acid; ricinoleic acid; polyricinoleic acid; and lightly blown castor oil; said aforementioned acylation product having at least one dibasic acyl radical directly linked to the amine residue, as differentiated from the ricinoleyl radical.

5. A sub-resinous acylation reaction compound, derived by reaction between, first, an acidic fractional ester; and second, tris (hydroxymethyl) aminomethane $NH_2C(CH_2OH)_3$ said aforementioned acidic fractional ester being derived from a dibasic carboxy acid and a ricinoleic acid compound selected from the class consisting of monohydric alcohol esters of ricinoleic acid; polyhydric alcohol esters of ricinoleic acid; ricinoleic acid; polyricinoleic acid; and lightly blown castor oil; said aforementioned acylation product having at least one dibasic acyl radical directly linked to the amine residue, as differentiated from the ricinoleyl radical.

6. A method of manufacturing a sub-resinous acylation reaction compound, consisting in producing an acylation reaction between, first, an acidic fractional ester, and second, an acylation reactive amine of the formula:

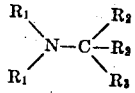

in which $R_2$ is selected from the class consisting of alkylol radicals and alkylol-ether radicals; $R_3$ is selected from the class consisting of hydrogen atoms, alkyl radicals, alkylol radicals and alkylol-ether radicals; and $R_1$ represents a member of the class consisting of alkylol radicals, alkylol-ether radicals and radicals derived by removal of an alpha-hydrogen atom from a monocarboxy acid ester; said aforementioned acidic fractional ester being derived from a polybasic carboxy acid and a ricinoleic acid compound selected from the class consisting of monohydric alcohol esters of ricinoleic acid; polyhydric alcohol esters of ricinoleic acid; ricinoleic acid; polyricinoleic acid; and lightly blown castor oil; said aforementioned acylation product having at least one polybasic acyl radical directly linked to the amine residue, as differentiated from the ricinoleyl radical.

MELVIN DE GROOTE.
BERNHARD KEISER.